United States Patent Office 3,298,981
Patented Jan. 17, 1967

3,298,981
POLYHYDROXYETHERS OF 1,4-CYCLOHEXANE-DIMETHANOL
John S. Fry and Warren F. Hale, Somerville, N.J., assignors to Union Carbide Corporation, a corporation of New York
No Drawing. Filed Oct. 14, 1963, Ser. No. 316,180
11 Claims. (Cl. 260—18)

This invention relates to novel polyhydroxyethers of 1,4-cyclohexanedimethanol, and more particularly to the preparation of crosslinked derivatives thereof.

Condensation polymers of epichlorohydrin and dihydric compounds such as bisphenol-A have been found useful as varnishes, lacquers and in other coating applications. In general, however, they share a common drawback, viz., poor weathering characteristics, a defect which limits their outdoor usefulness. One class of such condensation polymers is the polyhydroxyethers.

It is, therefore, an object of this invention to provide polyhydroxyethers which can be modified to a weather resistant form.

It is another object to provide modified polyhydroxyethers suitable for use as weather resistant coatings.

It is still another object to provide polyhydroxyethers which can readily be crosslinked with commercially available crosslinking agents.

Other objects of the invention will become apparent to those skilled in the art upon an examination of the detailed explanation below.

It has now been found that polyhydroxyethers prepared from the monoglycidyl ether of 1,4-cyclohexanedimethanol can be readily crosslinked with a variety of crosslinking agents to form coatings with outstanding weathering characteristics. These coatings surprisingly possess exceptional impact strength and exhibit excellent resistance to solvent attack.

The synthesis of the unmodified polyhydroxyethers is made possible by virtue of the discovery that a monoglycidyl ether rather than the diglycidyl ether of 1,4-cyclohexanedimethanol can be prepared by the interaction of approximately equimolar quantities of an epihalohydrin and 1,4-cyclohexanedimethanol. As to the latter compound, either the cis or trans isomer can be used as well as a mixture of both. It has been found convenient to employ a mixture of about 30 percent cis isomer and about 70 percent trans isomer.

The sequence of reaction steps believed to take place in the formation of the monoglycidyl ether of 1,4-cyclohexanedimethanol is depicted in the scheme below.

STEP 1

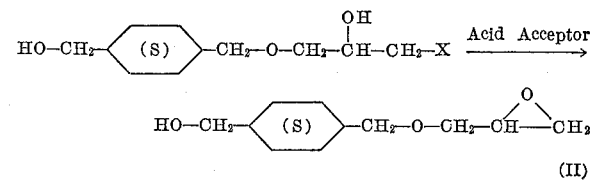

STEP 2

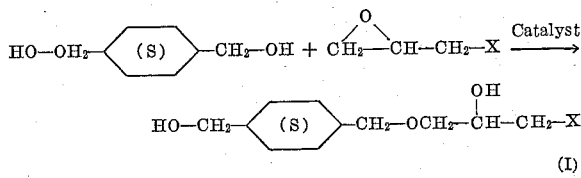

wherein X is F, Cl, Br or I.

In the first step, one mole of 1,4-cyclohexanedimethanol is reacted with one mole of an epihalohydrin in the presence of an acidic catalyst to form the monohalohydrin intermediate. For this purpose, Friedel-Crafts catalysts such as halides of boron, aluminum or iron can be used. Boron trifluoride, aluminum trichloride and iron trichloride, are particularly useful.

The catalyst concentration generally ranges between 0.01 percent to 5 percent by weight based on the diol.

Various epihalohydrins such as epichlorohydrin, epibromohydrin, epiiodohydrin, and substituted epihalohydrins such as chloroisobutylene oxide and the like can be used as the coreactant with 1,4-cyclohexanedimethanol in the preparation of the monoglycidyl ether.

The reaction can be carried out in the melt or in the presence of inert liquid diluents, such as aromatic hydrocarbons, e.g., benzene, toluene and xylenes; aliphatic hydrocarbons e.g., hexane, heptane and octane; ketones e.g., acetone, methyl ethyl ketone and methyl isobutyl ketone; water; ethers, e.g., diethyl ether, dibutyl ether, dioxane, and tetrahydrofuran; halogenated hydrocarbons e.g., carbon tetrachloride, trichloroethylene and tetrachloroethane; and the like. The reaction temperature usually ranges between 50° C. and 190° C. depending on the solvent used and the pressure. Pressures above atmospheric are not necessary but may be employed as can less than atmospheric pressure. The reaction time required for the formation of the monohalohydrin will vary with the reaction temperature, but ordinarily reaction times of 2 to 24 hours at 50° C. to 190° C. are used.

The second step of the monoglycidyl ether preparation requires the use of a dehydrohalogenating agent to effect the conversion of monohalohydrin to monoglycidyl ether in accordance with Equation II. Acid acceptors for example, sodium hydroxide, tertiary amines, sodium aluminate and like compounds well known in the art to serve as dehydrohalogenating agents are used.

The polymerization of the monoglycidyl ether of 1,4-cyclohexane dimethanol is readily effected by means of Friedel-Crafts catalysts. Boron trifluoride etherate is preferred but other catalysts which can be used include: aluminum trichloride, ferric chloride, zinc chloride, stannic chloride, aluminum tribromide, phosphorus pentafluoride, boron trifluoride-ethylamine complex and the like. The thermoplastic polyhydroxyether resin thus obtained may be represented by the structure

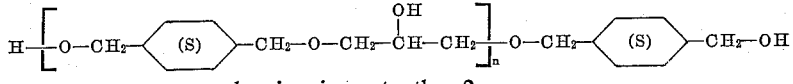

wherein $n$ is greater than 2.

Since the polymerization reaction is exothermic, initially no heat need be applied. In order to insure completeness of reaction, it has been found useful to raise the reaction temperature at the end of the run to about 60–70° C. for one hour. However, this final elevated temperature step is not critical. The polymerization can be carried out in any of the inert liquid diluents recited above for the preparation of the monoglycidyl ether. As a point of preparative technique, it has been found convenient to polymerize the monoglycidyl ether in the solvent in which it was synthesized thus obviating isolation and redissolving process steps.

The crosslinking of the polyhydroxyethers can be accomplished by several classes of crosslinking agents, viz., (1) Melamine formaldehyde resins
(2) Polymethylolated phenolic materials
(3) Organic polyisocyanates
(4) Polyunsaturated fatty acids.

The alkyl and aryl substituted melamine formaldehyde resins as well as the polymethyl ethers of polymethylol melamines can be used. Butylated melamine formaldehyde resin and hexamethylol melamine hexamethyl ether are preferred members of this class. If desired, hexamethylol melamines of a lower degree of etherification can also be employed.

The polymethylolated phenolic materials preferred as crosslinking agents in this invention are: (a) the resole resins prepared from formaldehyde and branched lower alkyl group substituted phenols, e.g., p-tert-butylphenol; p-tert-octylphenol or p-tert-nonylphenol, (b) 2,4,6-tris (hydroxymethyl)phenol and the alkali and alkaline earth metal salts thereof, and (c) dimethylol substituted alkylphenols wherein the alkyl group has from 1 to 6 carbon atoms such as dimethylol-p-tert-butylphenol and dimethylol-p-methylphenol.

While 2,4-tolylene diisocyanate has been particularly effective in crosslinking the polyhydroxyethers, other polyisocyanates which can be used include: diphenylmethane diisocyanate, dianisidine diisocyanate (3,3'-dimethoxy-4,4'-biphenylene diisocyanate), bitolylene diisocyanate, meta xylylene diisocyanate, polymethylene polyphenyl isocyanate and the like.

A cheap and commercially available source of polyunsaturated acids which crosslink readily with polyhydroxyethers is found in dehydrated castor oil. Other sources which can be used in the invention include: tall oil, linseed oil, soybean oil, tung oil, oititcica oil, perilla oil, and safflower oil.

BAKED COATINGS

For the formation of baked coatings, it has been found preferable to employ the melamine formaldehyde resins, polymethylolated phenolic materials or polyisocyanates as crosslinking agents. Baking temperatures of about 250° F. to 400° F. can be used with melamine formaldehyde resins and polymethylolated phenolic materials although the temperature range of about 300° F. to 400° F. is preferred. Similarly, with the polyisocyanates the crosslinking operation can be carried out in the range of about 220° F. to 420° F. but the range from about 250° F. to 390° F. is preferred.

The amount of crosslinking agent to be used in the invention is not critical, depending more on the properties of the crosslinked polyhydroxyether product desired than on any other consideration. Of course, it will be apparent to anyone skilled in the art that there are optimum levels for each crosslinking agent beyond which no further improvements in physical properties are realized. The preferred concentration of both the melamine resins and polymethylolated phenolic materials is about 10 to 50 parts by weight per hundred parts of polyhydroxyether although other concentrations are effective too.

The preferred concentration of polyisocyanate crosslinking agents is about 15 to 110% by weight of the stoichiometric crosslinking amount which is determined from the number of hydroxyl groups in the polyhydroxyether being used. If desired, other concentrations can be employed.

VARNISHES

For the preparation of varnishes which dry or cure at ambient temperatures, it is preferred to employ polyunsaturated acids for crosslinking the polyhydroxyethers. When used in conjunction with hydrogenated rosin and accelerators, these polyunsaturated acids afford polyhydroxyether formulations which set to tough, weather resistant, protective coatings on steel panels without baking.

Metal salts, such as cobalt octoate, manganese octoate, lead naphthenate, calcium naphthenate, zinc naphthenate, manganese naphthenate and the like, which are commonly used as driers in oil base paints, can function as accelerators.

The preferred range of polyunsaturated fatty acids to be used as crosslinking agents is about 20 to 60% by weight based on the polyhydroxyethers. However, other ranges of polyunsaturated fatty acids can also be used to effect crosslinking.

The following examples are illustrative of this invention. Unless otherwise specified, all percentages and parts given are by weight.

*Example 1.—Preparation of the monoglycidyl ether of 1,4-cyclohexanedimethanol*

A three-neck, 2-liter, round bottom flask equipped with a mechanical stirrer, a thermometer, a Dean-Stark trap, a dropping funnel and condenser was charged with 288.4 g. (2.0 moles) of 1,4-cyclohexanedimethanol (approximately 70% trans isomer and 30% cis isomer) and 500 g. of toluene. The stirred mixture was refluxed until about 25 ml. of toluene-immiscible distillate was collected in the Dean-Stark trap. The trap was then removed and the solution allowed to cool under an atmosphere of dry nitrogen. When the temperature of the solution had decreased to 35° C., 3.6 g. of boron trifluoride etherate was added to the reaction flask and mixed with the other reactants for 30 minutes. The dropwise addition of 195.2 g. (2.0 moles) of epichlorohydrin was then initiated from the dropping funnel. The complete addition of the epichlorohydrin required 2 hours during which time the exothermic reaction raised the temperature of the reactor contents to 69° C. Mechanical agitation was continued for an additional 16 hours after which the mixture was refluxed for 3 hours at 114° C. and then allowed to cool to 25° C.

A solution of 85.0 g. (2.10 moles) of sodium hydroxide in 85.0 g. of water was added dropwise to the cooled reaction mixture over a period of 1 hour followed by two hours of refluxing. The reactor was again allowed to cool to 25° C. and the toluene solution of the monoglycidyl ether of 1,4-cyclohexanedimethanol decanted, filtered free of precipitated sodium chloride and dried by azeotropic distillation.

*Example 2.—Polyhydroxyether of 1,4-cyclohexanedimethanol*

To the toluene solution of the monoglycidyl ether of 1,4-cyclohexanedimethanol obtained in Example 1 contained in a 3 neck, round bottom flask was added with agitation a solution of 2 ml. of boron trifluoride etherate in 10 ml. of dry toluene. This polymerization reaction was exothermic resulting in a maximum temperature of 54° C. External heat was then applied bringing the reactor temperature to 60–67° C. which was maintained for one hour. The flask was cooled, and 50 ml. of n-butanol was added. The solution was washed with three successive 200 ml. portions of 5% aqueous sodium hydroxide in a separatory funnel followed by three additional washings with 200 ml. portions of distilled water.

The solvents were stripped off under vacuum leaving a 437 g. residue of the polyhydroxyether of 1,4-cyclohexanedimethanol having the structure

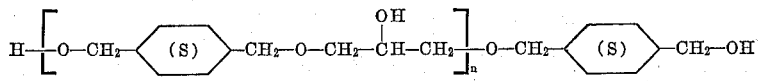

wherein n is greater than 2.

Example 3

Baked crosslinked coatings on cold rolled steel 3″ x 5″ panels were prepared from the formulations A and B below:

|  | Parts by Weight | |
| --- | --- | --- |
|  | A | B |
| Polyhydroxyether of 1,4-cyclohexanedimethanol (84% solution in toluene) | 11.9 | 11.9 |
| Butylated Melamine-Formaldehyde Resin (50% solution in n-Butanol) |  | 4.0 |
| Hexamethylol melamine hexamethyl ether | 3.0 |  |
| p-Toluene sulfonic acid | 0.1 |  |
| Ethylene glycol monoethyl ether | 10.0 | 5.0 |

The panels were dip coated in these formulations, air dried for 30 minutes and baked for 30 minutes at 350° F. The resulting coatings which formed on the panels were immersed in separate containers of gasoline, dioxane, ethanol and acetone for 5 minutes. The coatings were resistant to these solvents showing no evidence of swelling, peeling, or cracking. The coatings prepared with formulation A passed a 60 inch-pound Gardner impact test while those prepared with formulation B passed a 40 inch-pound test.

The Gardner impact test is a falling-weight method for determining mechanical properties as described on pages 740–4 of the Plastics Engineering Handbook of the Society of the Plastics Industry, Reinhold Publishing Company, New York (1954) and by H. A. Gardner in Physical and Chemical Examination of Paints, Varnishes, Lacquers and Colors, Washington, D. C., 5th Edition, 1930.

These data indicate the ability of a film or coating to withstand the force of an impinging 1 lb. ball dropped from various heights given in inches. In this test the coating is rapidly distended as the ball causes a deep hemispherical indentation in the panel. The automotive industry requires paints to withstand 28 inch-pounds without cracking or peeling on the concave side of the indentation. Coatings prepared with both formulations on the steel panels exhibited no physical changes after outdoor exposure for 6 months.

Example 4

A steel panel coating formulation utilizing a diisocyanate crosslinking agent contained the following:

Parts by weight
Polyhydroxyether of 1,4-cyclohexanedimethanol
  (84% solution in toluene) _____ 23.8
2,4-tolylene diisocyanate _____ 10.0
Ethyl acetate _____ 10.0

The 3″ x 5″ panels were dip coated in the formulation and baked for 30 minutes at 320° F. The coated panels were immersed in separate containers of gasoline, dioxane and ethanol for 5 minutes with no evidence of attack by these solvents. These films passed a 60 inch-pound Gardner impact test.

Example 5

An air drying varnish was prepared in a one-liter 3 neck round bottom flask equipped with a mechanical stirrer, thermometer, Dean-Stark trap, reflux condenser and gas inlet tube using the following formulation:

Parts by weight
Polyhydroxyether of 1,4-cyclohexanedimethanol __ 69.5
Dehydrated castor oil unsaturated acids _____ 39.0
Hydrogenated rosin _____ 11.5

This mixture was refluxed at 190–199° C. for 4 hours while removing the water of reaction as an azeotrope in the Dean-Stark trap. The mixture was cooled and 20 parts each of xylene, toluene and n-butanol were added together with 0.5 part of cobalt octoate (6% cobalt), 0.1 part of manganese octoate (6% manganese) and 0.1 part of calcium naphthenate (4% calcium). Cold rolled steel, 3″ x 5″ panels were dip coated with this product and allowed to air dry for five days at ambient temperatures. The resultant films which formed on the test panels were tough and flexible and showed no physical changes after 6 months of outdoor exposure.

Although this invention has been described with a certain degree of particularity, it is understood that numerous changes may be made without departing from the spirit and scope of this invention.

What is claimed is:

1. The monoglycidyl ether of 1,4-cyclohexanedimethanol having the structure

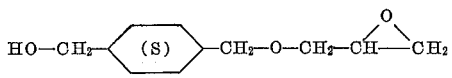

2. The polyhydroxyether of 1,4-cyclohexanedimethanol having the structure

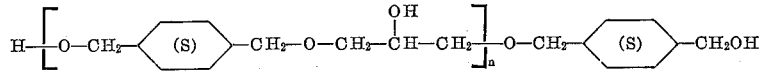

wherein n is greater than 2.

3. The product of claim 2 crosslinked with a crosslinking amount of crosslinking agent selected from the class consisting of polymethyl ethers of hexamethylol melamine, butylated melamine formaldehyde resin, polyisocyanates, and polyunsaturated fatty acids.

4. The crosslinked product of claim 3 wherein the crosslinking agent is a polymethyl ether of hexamethylol melamine.

5. The crosslinked product of claim 3 wherein the crosslinking agent is a butylated melamine formaldehyde resin.

6. The crosslinked product of claim 3 wherein the crosslinking agent is a polyisocyanate.

7. The crosslinked product of claim 3 wherein the crosslinking agent is a polyunsaturated fatty acid.

8. The method of preparing weather resistant coatings which comprises contacting a polyhydroxyether of 1,4-cyclohexanedimethanol with a crosslinking amount of a crosslinking agent selected from the group consisting of the hexamethyl ether of hexamethylol melamine, butylated melamine formaldehyde resin, diisocyanates and polyunsaturated fatty acids.

9. The method of claim 8 wherein the crosslinking agent is the hexamethyl ester of hexamethylol melamine and the crosslinking temperature is about 250° F. to 450° F.

10. The method of claim 8 wherein the crosslinking agent is a diisocyanate and the crosslinking temperature is about 220° F. to 420° F.

11. The method of claim 8 wherein the crosslinking agent is a polyunsaturated fatty acid.

References Cited by the Examiner

UNITED STATES PATENTS

| 2,995,583 | 8/1961 | Larkin et al. | 260—348.6 |
| 3,033,822 | 5/1962 | Kiblier et al. | 260—22 |
| 3,096,349 | 7/1963 | Meyer et al. | 260—348.6 |

LEON J. BERCOVITZ, *Primary Examiner.*

R. W. GRIFFIN, *Assistant Examiner.*